United States Patent Office 3,121,122
Patented Feb. 11, 1964

3,121,122
POLYCYCLIC HYDROCARBONS AND
PROCESS THEREFOR
Hans K. Reimlinger, Brussels, Belgium, assignor to Union
Carbide Corporation, a corporation of New York
No Drawing. Filed Aug. 11, 1959, Ser. No. 832,893
Claims priority, application Belgium Sept. 30, 1958
10 Claims. (Cl. 260—668)

This invention relates to novel highly-condensed polycyclic hydrocarbons having 6, 7 or 8 rings and to methods for their preparation.

The preparation of highly condensed polycyclic hydrocarbons has been the subject of much research in various fields of organic chemistry, and primarily in those fields relating to dye preparations. In this regard, workers have been primarily interested in the properties of fluorescence which characterize such hydrocarbons. However, recently the possible use of these hydrocarbon compounds as radiation detectors has also been the subject of investigation. In this connection, it has been noted that there is a close relationship between the appearance of fluorescent properties, and sensitivity to radiation and the presence of a condensed polycyclic hydrocarbon structure.

It is, therefore, an object of this invention to provide novel polycyclic aromatic hydrocarbons. It is also an object of this invention to provide a process for the preparation of the novel polycyclic aromatic hydrocarbons.

According to this invention, novel highly condensed polycyclic aromatic hydrocarbons are provided having the general formula $C_nH_m$, wherein $n$ represents an even numbered integer of from 28 to 30 and $m$ represents an even numbered integer of from 16 to 22, said hydrocarbons having a minimum of 6 condensed rings and a maximum of 8 condensed rings, and being characterized by having a preformed 1,1'-diphenanthryl unit.

The novel compounds of this invention, owing to their highly condensed aromatic structures, and in particular to their crystal coloration and absorption spectra and their strong fluorescence properties have utility as radiation detectors and in particular as detectors for beta and alpha particles. They also have obvious utility as intermediates in the production of many other organic compositions.

A general method of obtaining the novel hydrocarbons of this invention having the highest degree of condensation, i.e., having the overall formula $C_{30}H_{16}$, comprises subjecting a hydrocarbon having the formula $C_{30}H_{16+p}$ in which $p$ is an integer of 2, 4 or 6 to catalytic cyclodehydrogenation. Those compounds having the highest degree of condensation may be represented as tribenzoperylenes and include the following structures:

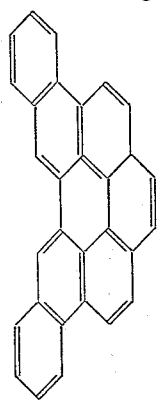

1,12,4,5,8,9-tribenzoperylene

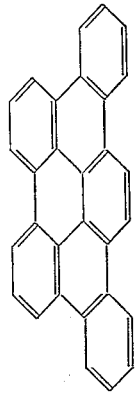

1,12,2,3,10,11-tribenzoperylene

The general method outlined above will result in the tribenzoperylene compounds in accordance with the nature of the precursor composition being cyclodehydrogenated. These precursors may be either partially hydrogenated hydrocarbons or aromatic hydrocarbons. The selection between the partially hydrogenated hydrocarbon and the aromatic hydrocarbon as the precursor is determined solely by the structure of the final product desired. Thus the cyclodehydrogenation of 1,2,7,8-tetrahydrodinaphtho(1',2',3,4)(2'',1'',5,6)phenanthrene will produce 1,12,4,5,8,9-tribenzoperylene. Similarly, the cyclodehydrogenation of 1,4-diphenyltriphenylene will produce 1,12,2,3,10,11-tribenzoperylene.

In accordance with one of the two preferred methods of preparation, the partially hydrogenated hydrocarbon may itself be prepared from an immediately lower analog to which two additional carbon atoms are added. The addition of the latter carbon atoms is accomplished by means of a dienophilic condensation followed by dehydrogenation and decarboxylation. Therefore, in preparaing 1,12,4,5,8,9-tribenzoperylene a $C_{28}$ homolog is reacted with maleic anhydride in order to add the two carbon atoms required. The intermediate anhydride thus obtained is then subjected to conventional dehydrogenation and decarboxylation. The sequence of these operations may be more clearly shown in the following reaction scheme.

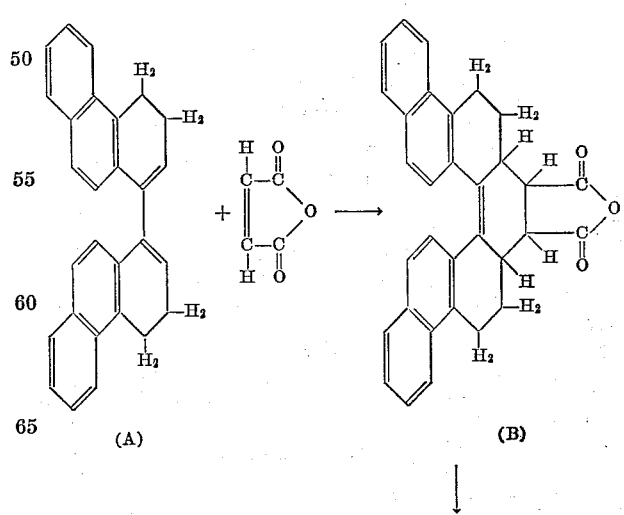

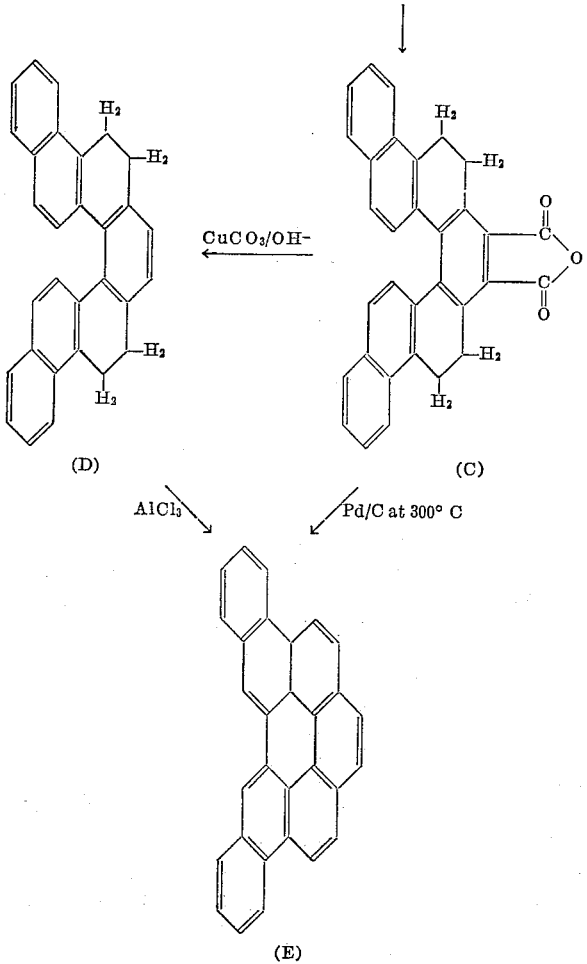

In the above, compound (A) 3,4,3′,4′-tetrahydrodiphenanthryl-(1,1′) reacts as a dienophilic substance in the presence of maleic anhydrie, leading to a Diels-Alder condensation in the 1,12 position. The intermediate condensation product B is dehydrogenated by means of an equimolecular quantity of bromine whereby compound (C) 1,2,7,8 - tetrahydrodinaphtho(1′,2′,3,4)(2″,1″,5,6) phenanthrene dicarboxylic anhydride is formed. By decarboxylation of this compound, effected in the presence of basic copper carbonate, compound (D), 1,2,7,8-tetrahydrodinaphtho(1′,2′,5,6)(2″,1″,5,6) phenanthrene is obtained. On treatment of this partially hydrogenated hydrocarbon with aluminum chloride as a catalyst, the final product (E), 1,12,4,5,8,9-tribenzoperylene is obtained.

Compound E can also be attained directly from compound C by subjecting said compound to a high temperature (i.e., about 300° C.) in the presence of a palladium-carbon catalyst whereby cyclodehydrogenation is effected.

In accordance with the other preferred embodiment of the general method, a tribenzoperylene is obtained in a single step by subjecting an aromatic hydrocarbon having the same number of carbon atoms as the tribenzoperylene but corresponding to a lower degree of cyclization, to a dehydrogenating cyclization, carried out in the presence of a catalyst such as aluminum chloride. By way of example, 1,12,2,3,10,11-tribenzoperylene (hereinafter also to be identified as compound G) can be synthesized in this way from 1,4-diphenyl triphenylene.

Among other aromatic hydrocarbons also suitable and useful for the preparation of 1,12,2,3,10,11-tribenzoperylene there may be included 1,2,3,4-tetraphenylbenzene, 5-phenyl - 1,2,6,7 - dibenzopyrene and 1,2,3,4,5,6,7,8 - tetrabenzophenanthrene.

The latter method of this invention is not limited to the use of aluminum chloride as catalyst. Any catalyst of the same type normally used for Fridel-Crafts reactions, that is to say, $FeCl_3$, $SnCl_4$, etc., can also be employed. However, it is advisable to add to this catalyst a salt, such as sodium chloride, in order to obtain a reduction of the melting point of the catalyst. The reaction should be carried out at a temperature of between about 100 and about 150° C. The addition of a solvent is not essential, since the sodium chloride/catalyst mixture acts as such. The operation is normally carried out at ordinary pressure in the presence of an excess of the sodium-chloride/catalyst mixture.

However, it is to be understood that the new products to which the invention refers include not only the most highly condensed polycyclic hydrocarbons already described, i.e., those hydrocarbons of the general formula $C_{30}H_{16}$, but also the intermediate compounds A, C and D previously indicated and 1,4-diphenyltriphenylene hereinafter also to be identified as compound F. Compound A is prepared from 8-tetanthrenone by reduction over amalgamated aluminum to the corresponding pinacol. The latter loses one molecule of water in the presence of acids, thereby resulting in compound A. 1,4-diphenyl triphenylene is prepared from the dicarboxylic anhydrie of 1,4-diphenyltriphenylene, by decarboxylation in the presence of basic copper carbonate.

The characteristics and special uses of these products are as follows:

COMPOUND A.—3,4,3′,4′-TETRAHYDRO-DIPHENANTHRYL(1,1′)

A solid in the form of colorless needles having a melting point of 229.5–231° C., a molecular weight of 358.5 and an overall formula $C_{28}H_{22}$.

This compound, which can be used for the synthesis of compound E by the method in accordance with the present invention, can also be used in synthesis with many dienophilic compounds. By halogenation, there can be obtained a halogenated compound which can be directly used as a starting material for the synthesis of insecticides.

COMPOUND C. — 1,2,7,8 - TETRAHYDRODINAPHTHO(1′,2′,3,4)(2″,1″,5,6) PHENANTHRENE DICARBOXYLIC ANHYDRIDE

A solid, in the form of small crystalline plates. It has a melting point of 281–283° C., a molecular weight of 454.5, and an overall formula $C_{32}H_{20}O_3$.

This compound can be used for the synthesis of compound E in accordance with the method of the present invention. However, it can also be used as an intermediate in reactions with quinones, leading to hydroquinones for use in dyes.

COMPOUND D.—1,2,7,8-TETRAHYDRODINAPHTHO(1′,2′,3,4)(2″,1″,5,6) PHENANTHRENE

A solid, crystalline colorless composition having a melting point of 210.5–320.5° C., a molecular weight of 382.5, and an overall formula $C_{30}H_{22}$.

This compound can be used for the synthesis of compound E in accordance with the method of the present invention. However, due to its reactivity towards Friedel-Crafts reagents, this compound may readily be used for the prepartion, in a single stage, of halogen derivatives of tribenzoperylene.

COMPOUND E.—1,12,4,5,8,9-TRIBENZOPERYLENE

A solid, yellowish orange, crystalline composition having a melting point of 371–372° C., a molecular weight of 376.46, and an overall formula $C_{30}H_{16}$.

This compound is relatively insoluble in most of ordinary solvents. It possesses a strong yellow-green fluorescence and structural characteristics that enable it to be used as a radiation detector.

COMPOUND F.—1,4-DIPHENYL TRIPHENYLENE

A solid, in the form of colorless needles, having a melting point of 222–223° C., a molecular weight of 380.5, an overall formula $C_{30}H_{20}$ and the following structural formula:

(F)

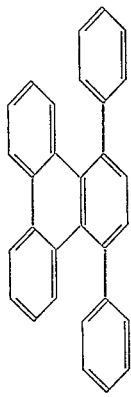

The above compound can be used, as aforementioned, in the production of compound G.

COMPOUND G.—1,12,2,3,10,11-TRIBENZOPERYLENE

A solid, in the form of pale yellow needles, having a melting point of 380° C., a molecular weight of 376.46, and an overall formula $C_{30}H_{16}$.

This compound has a very strong green fluorescence and structural characteristics such that it can be used as a radiation detector. Examination of the infrared spectrum of this compound makes it possible to identify it completely with respect to the isomer described as compound E.

Compounds E and G described above constitute the highest state of condensation compatible with the overall formula $C_{30}H_{16}$. As aforementioned they both have a condensed aromatic structure and possess absorption spectra and fluorescence properties such that it is obvious that they are sensitive to radiation, as for instance beta and gamma radiation. They may thus be used as detectors or counters of such radiation. For this purpose, crystals of these compounds E or G may be connected with a photomultiplier, so arranged as to collect the maximum amount of light energy radiated by the crystals, and also connected to a suitable amplifier. It is possible, therefore, to establish that the effectiveness of compounds E and G as radiation detectors, is several times greater than that of anthracene. The latter compounds, up to the present time, has been considered the best organic scintillator and is very generally used for this purpose in detecting radiations.

It is also obvious, that compounds E and G can be subjected to nitration, halogenation or perhalogenation reactions and thus lead to substituted polycyclic hydrocarbons. Moreover, following their oxidation, compounds E and G can serve as intermediates in the synthesis of various dyestuffs.

*Example I*

SYNTHESIS OF 1,12,4,5,8,9-TRIBENZOPERYLENE (a) 10.3 g. of 8-tetanthrenone were dissolved in a mixture of 65 cc. of absolute ethyl alcohol and 37 cc. of absolute benzene.

There was then added 2.3 g. of aluminum flakes (previously degreased in ether) and 110 mg. of $HgCl_2$. This mixture was heated under reflux for about 3 days under conditions of moderate agitation. After cooling to ordinary temperature, the reaction mixture was filtered and the solid portion, after washing with benzene, was identified as being a pinacol (melting point 222–223° C.). The pinacol was dissolved in 3 liters of acetic acid and heated under reflux until it was entirely dissolved.

The boiling solution was then filtered in order to remove the impurities and the filtrate concentrated to about half its initial volume. The hot concentrated solution was again filtered. Upon cooling to ordinary temperature, colorless needles were separated out of the filtrate. The crystals thus obtained had a melting point of 229.5–231° C. Analysis indicated the product was compound A, having the formula $C_{28}H_{22}$ as follows:

Calculated: C, 92.81%; H, 6.19%. Found: C, 93.71%; 93.87%; H, 5.96%, 5.96%.

(b) 956 mg. of compound A was dissolved in 25 cc. of nitrobenzene. There was then added 1.3 g. of maleic anhydride and the reaction mixture was heated under reflux for about 3 hours. After cooling to ordinary temperature, the excess nitrobenzene was removed by steam distillation.

The solid residue of dark brown color was dried at 100° C. for two hours and washed with concentrated acetic acid until a colorless filtrate was obtained. Finally, the solid residue was recrystallized several times in acetic acid in the presence of animal charcoal in order to obtain colorless crystals of a melting point of 281–283° C. These crystals were identified as compound B.

(c) 2.3 g. of compound B was dissolved in 50 cc. of chloroform. There was then added to this solution a solution of 1.69 g. of bromine and 10 cc. of concentrated acetic acid. At the end of an hour, a change in color was noted; the reaction mixture was then stirred with a small amount of mercury, the organic phase removed and a part of the solvent removed by distillation. Cooling to ordinary temperature caused the separation of yellow crystals which were identified as compound C.

(d) 0.43 g. of compound C, 15 cc. of quinoline and 1 g. of basic copper carbonate were mixed together. This mixture was then heated under reflux for two hours. After cooling to room temperature, 500 cc. of ether was added and the system filtered. 2 N HCl was then added to the filtrate. This solution was then neutralized, dried and the excess ether evaporated in order to obtain a crystalline product of a melting point of 319.5–320.5° C.

Analysis identified this product, as compound D having the formula $C_{30}H_{22}$ as follows.

Calculated: C, 94.20%; H, 5.80%. Found: C, 93.91%; H, 5.85%.

(e) 95 mg. of compound D, 862 mg. of $AlCl_3$ anhydride and 97 mg. of NaCl were thoroughly mixed together under an infrared lamp in order to avoid degradation due to humidity. The reaction mixture was then heated at 130° C. for two hours. When maintained under moderate agitation, the mixture became pasty, and was transformed into a solid mass of dark color. This mass was thereupon finally dissolved in hot benzene and passed over a chromatographic column filled with neutral aluminum oxide. This operation was repeated twice and the clear yellow crystals were separated out. Analysis of these crystals revealed a melting point of 371–372° C. Further analysis identified the product as having the formula $C_{30}H_{16}$ as follows.

Calculated: C, 95.72%; H, 4.28%. Found: C, 95.75%; H, 4.43%.

*Example II*

SYNTHESIS OF 1,12,4,5,8,9-TRIBENZOPERYLENE

Operations (a), (b) and (c) of Example I were repeated. Thereupon 0.88 g. of compound C and 0.65 g. of a mixture of 40 parts of palladium and 60 parts of animal charcoal were mixed together. This system was heated at 320° C. for 2½ hours. After cooling to room temperature the solid material obtained was extracted with hot benzene and the resultant yellowish solution passed over a chromatographic column filled with neutral aluminum oxide. This operation was repeated, and the benzene solution was concentrated to about half its initial volume until yellow crystals were separated. These crystals had a melting point of 371–372° C. Analysis, as well as determination of the melting point of mixtures, showed that the product thus obtained was identical to compound E.

Example III

SYNTHESIS OF 1,12,2,3,10,11-TRIBENZOPERYLENE (a) 1.02 g. of 1,4-diphenyl triphenylene 2,3-dicarboxylic anhydride was heated under reflux for about 20 hours in the presence of 2 g. of basic copper carbonate and 50 cc. of quinoline. After cooling to room temperature, the reaction mixture was dissolved in ether and the solution filtered to remove impurities. The excess ether was distilled off and an alcoholic potash solution was added to the residue. The residue was then heated under reflux for 1½ hours. After filtration, the residue was recrystallized in petroleum ether (80–100° C.) in the presence of animal charcoal, thereby obtaining colorless crystals of a melting point of 222–223° C.

Analysis identified the product as compound F, having the formula $C_{30}H_{20}$ as follows.

Calculated: C, 94.70%; H, 5.30%. Found: C, 94.49%; H, 5.49%.

(b) 488 mg. of compound F, 500 mg. of NaCl and 5 g. of $AlCl_3$ anhydrous were carefully mixed together under an infrared lamp in order to avoid degradation due to moisture. The reaction mixture was then heated at 120–130° C. for three hours. Upon being maintained under moderate agitation, the mixture was converted into a solid mass which was finally dissolved in benzene. The benzenic solution was then passed over a chromatographic column filled with neutral aluminum oxide. 3 fractions were identified:

Fraction 1: After evaporation of the solvent, there was collected a very small amount of an unidentified substance;

Fraction 2: The benzene solution showed a strong blue fluorescence. Evaporation of the solvent left a yellow product which, after recrystallization in benzene, had a melting point of 380° C. Analysis identified the product as compound G, having the formula $C_{30}H_{16}$ as follows.

Calculated: C, 95.75%; H, 4.28%. Found: C, 95.47%; H, 4.47%.

Spectral analysis in the infrared spectrum showed that compound G was definitely different from compound E and corresponded to 1,12,2,3,10,11-tribenzoperylene.

Fraction 3: Consisted primarily of a product similar to cold tar, identification of which was not effected.

What is claimed is:
1. 1,12,4,5,8,9-tribenzoperylene.
2. 1,2,7,8 - tetrahydrodinaphtho(1′,2′,3,4)(2″,1″,5,6)-phenanthrene.
3. 3,4,3′,4′-tetrahydrodiphenanthryl(1,1′).
4. A process for preparing condensed polycyclic aromatic hydrocarbons, which comprises subjecting a hydrocarbon having the formula $C_{30}H_{16+p}$ in which $p$ represents an even numbered integer of from 2 to 6, to catalytic cyclodehydrogenation.
5. A process as claimed in claim 4, in which the hydrocarbon having the formula $C_{30}H_{16+p}$ is a partially hydrogenated hydrocarbon.
6. A process as claimed in claim 4, in which the hydrocarbon having the formula $C_{30}H_{16+p}$ is an aromatic hydrocarbon.
7. A process as claimed in claim 5, in which the hydrocarbon is 1,2,7,8-tetrahydrodinaphtho(1′,2′,3,4)(2″,1″,5,6)phenanthrene and the catalyst is aluminum chloride.
8. A process as claimed in claim 6, in which the aromatic hydrocarbon is 1,4-diphenyl triphenylene, the catalyst is an aluminum chloride-sodium chloride mixture, and the reaction is carried out at a temperature of between 100° C. and 150° C.
9. A process for preparing 1,12,4,5,8,9-tribenzoperylene which comprises the steps of reacting 3,4,3′,4′-tetrahydrodiphenanthryl(1,1′) with maleic anhydride, subjecting the product formed thereby to an equimolecular amount of bromine whereby 1,2,7,8-tetrahydro dinaphtho(1′,2′,3,4)-(2″,1″,5,6)phenanthrene dicarboxylic anhydride is formed, decarboxylating the anhydride in the presence of basic copper carbonate, whereby 1,2,7,8-tetrahydrodinaphtho(1′,2′,3,4)(2″,1″,5,6)phenanthrene is formed, and treating the latter compound with aluminum trichloride.
10. A process for preparing condensed polycyclic aromatic hydrocarbons, which process comprises subjecting the dicarboxylic anhydride of 1,2,7,8-tetrahydrodinaphtho(1′,2′,3,4)(2″,1″,5,6)phenanthrene to a temperature of around 300° C. in the presence of a palladium-carbon catalyst, thereby effecting catalytic cyclodehydrogenation.

References Cited in the file of this patent
UNITED STATES PATENTS

| | | |
|---|---|---|
| 2,190,191 | Pier et al. | Feb. 13, 1940 |
| 2,231,787 | Adams | Feb. 11, 1941 |
| 2,386,507 | Quin | Oct. 9, 1945 |
| 2,912,442 | Webster | Nov. 10, 1959 |

OTHER REFERENCES

Abramov: "Doklady Akad. Nauk SSSR" 63 pp. 637–40 (1948), (abstracted in "Chemical Abstracts 43, p. 2585).

"Chemical Abstracts," Formula Index 43, p. 11496 (1948) ($C_{30}H_{20}$, triphenylene, 1,4-diphenyl-).

Medenwald: Berichte, vol. 86 (1953), pages 287–293.

Clar et al.: "Chemical Society Journal," 1958, pp. 1861–5 (abstracted in "Chemical Abstracts" 52, p. 20093).